US007454261B2

(12) United States Patent
Kim

(10) Patent No.: US 7,454,261 B2
(45) Date of Patent: Nov. 18, 2008

(54) TABLET AUTOMATIC PACKAGING MACHINE AND METHOD FOR AUTOMATICALLY RECOGNIZING CASSETTES COUPLED TO CARTRIDGES THEREOF

(75) Inventor: Jun-ho Kim, Dalseo-Gu (KR)

(73) Assignee: JVM Co., Ltd., Daegu (KR)

( * ) Notice: Subject to any disclaimer, the term of this patent is extended or adjusted under 35 U.S.C. 154(b) by 525 days.

(21) Appl. No.: 11/144,817

(22) Filed: Jun. 6, 2005

(65) Prior Publication Data

US 2006/0201107 A1 Sep. 14, 2006

(30) Foreign Application Priority Data

Mar. 10, 2005 (KR) ...................... 10-2005-0020242

(51) Int. Cl.
*G06F 19/00* (2006.01)

(52) U.S. Cl. ............................ 700/117; 700/231; 221/9

(58) Field of Classification Search ................. 700/115, 700/117, 213, 231, 236, 242, 244; 53/154; 221/9
See application file for complete search history.

(56) References Cited

U.S. PATENT DOCUMENTS 5,502,944 A * 4/1996 Kraft et al. ..................... 53/55
6,611,733 B1 * 8/2003 De La Huerga ............. 700/236
7,080,755 B2 * 7/2006 Handfield et al. ............. 221/13
2004/0117062 A1 * 6/2004 Bonney et al. .............. 700/237
2004/0172163 A1 * 9/2004 Varis .......................... 700/237
2004/0176873 A1 * 9/2004 Kim ........................... 700/231
2005/0234591 A1 * 10/2005 Kim ........................... 700/231

* cited by examiner

*Primary Examiner*—Alexander J Kosowski
(74) *Attorney, Agent, or Firm*—Oblon, Spivak, McClelland, Maier & Neustadt, P.C.

(57) ABSTRACT

Tablet automatic packaging machine and method for automatically recognizing cassettes of the cartridges of the tablet automatic packaging machine are disclosed. The tablet automatic packing machine includes a plurality of cartridges arranged in multiple layers. Each cartridge is coupled to a tablet cassette having a cassette memory in which tablet information or cassette information is recorded. Also, the cartridge comprises an inner memory to store cartridge information, a first data transmitting/receiving unit to transmit and receive commands related to preparation therefrom/thereto, a second data transmitting/receiving unit to transmit and receive commands related to cassette positions, and a control unit to control transmission from the cartridge information read from the inner memory to an external device based on reception of the commands related to cassette positions.

1 Claim, 4 Drawing Sheets

TABLET AUTOMATIC PACKAGING MACHINE AND METHOD FOR AUTOMATICALLY RECOGNIZING CASSETTES COUPLED TO CARTRIDGES THEREOF

BACKGROUND OF THE INVENTION

1. Field of the Invention

The present invention relates to a tablet automatic packaging machine, and more particularly to a tablet automatic packaging machine which is capable of automatically recognizing cartridges and cassettes coupled to the cartridges, and a method for automatically recognizing the cassettes coupled to the cartridges thereof.

2. Description of the Related Art

Generally, a tablet automatic packaging machine, which may also be referred to as a tablet automatic dispensing machine, serves to automatically dispense tablets prepared based on patients' diseases and automatically package the dispensed tablets based on a dosage unit. The tablet automatic packaging machine is designed such that: a plurality of tablet cassettes, in which various tablets are contained, are installed on a plurality of cassette supporters (hereinafter, referred to as cartridges), respectively; the respective tablet cassettes are controlled to prepare the tablets based on a dosage unit to discharge the prepared tablets to the lower side thereof through passages formed at the cartridges, respectively; the tablets discharged from the cartridges are collected in a hopper; the tablets collected in the hopper are discharged to the lower side thereof; and the tablets discharged from the hopper are contained in pouches to be sealed by packaging means.

Such prior art tablet automatic packaging machines have been disclosed in Japanese Patent Application Nos. 1994-208787 and 1994-248055, and Korean Patent Application No. 2003-77945, etc.

More specifically, the prior art tablet automatic packaging machine is designed such that a memory, such as an EEPROM, can be included in only the tablet cassette, in which tablet information (drug information) or cassette information (cassette serial number, etc.) is recorded in the memory installed in the tablet cassette. The cartridge as a tablet cassette supporter senses states where the tablet cassette is mounted thereon, and receives tablet information and cassette information from the memory of the tablet cassette attached thereto, such that it can automatically recognize the tablet cassette.

The cartridges of the prior art tablet automatic packaging machine are empty in a normal state, and are then operated according to a preparation command inputted from the outside after it receives information recorded in the memory of the tablet cassette. Although a tablet cassette is mounted at another location, since information recorded in the memory of the tablet cassette is read out, preparation is normally performed.

However, if a plurality of tablet cassettes having memories in which information is identically recorded are mounted on the cartridges, since a server prepares tablets based on communication with the tablet automatic packaging machine cannot select one of the plurality of tablet cassettes having identical information, the prior art tablet automatic packaging machine makes medication errors.

Also, the prior art tablet automatic packaging machine has disadvantages in that, since it provides only information of tablets contained in a tablet cassette and information of the tablet cassette to the server but does not provide cartridge information thereto, if a location of tablets, etc., should be searched for as occasion demands, it is difficult to search for the location of the cartridge in which corresponding tablets are contained.

In addition, the prior art tablet automatic packaging machine has drawbacks in that, since only information recorded in a memory of the tablet cassette, for example, cassette information or tablet information, is transmitted to a controller within a cartridge, locations for cartridges not used cannot be directly confirmed at the server side.

SUMMARY OF THE INVENTION

Therefore, the present invention has been made in view of the above problems, and it is an object of the present invention to provide a tablet automatic packaging machine which is capable of transmitting information of cartridges to which tablet cassettes are coupled respectively to an external device to easily identify cartridges and confirm locations of the cartridges, and a method for automatically recognizing cassettes coupled to the cartridges thereof.

It is another object of the present invention to provide a tablet automatic packaging machine which is capable of dually transmitting information of cartridges through a path receiving commands related to preparation and another path, and a method for automatically recognizing cassettes of the cartridges thereof.

It is yet another object of the present invention to provide a tablet automatic packaging machine which is capable of selecting and driving a specific one of a plurality of tablet cassettes including identical information, and a method for automatically recognizing cassettes coupled to the cartridges thereof.

In accordance with an aspect of the present invention, the above and other objects can be accomplished by the provision of a tablet automatic packing machine in which a plurality of cartridges are arranged in multiple layers, each cartridge being coupled to a tablet cassette having a cassette memory in which tablet information or cassette information is recorded, wherein the cartridge comprises: an inner memory to store cartridge information; a first data transmitting/receiving unit to transmit and receive commands related to preparation therefrom/thereto; a second data transmitting/receiving unit to transmit and receive commands related to cassette positions; and a control unit to control transmission from the cartridge information read from the inner memory to an external device based on reception of the commands related to cassette positions.

Preferably, the control unit may control that information read from the cassette memory is transmitted to the second data transmitting/receiving unit together with the cartridge information.

Preferably, the first and second data transmitting/receiving units are an RS232 to RS485 converter, respectively.

Preferably, the control unit may read information recorded in the cassette memory and cartridge information recorded in the inner memory through an $I^2C$ bus.

In accordance with another aspect of the present invention, the above and other objects can be accomplished by the provision of a cassette automatic recognition method for automatically recognizing cassettes coupled to cartridges, comprising the steps of: reading cartridge information recorded in an inner memory; reading information recorded in a cassette memory of a tablet cassette which is mounted thereon; checking as to whether command data are received through data transmitting/receiving units which are different from each other; and controlling drive of the mounted tablet cassette based on the command data received through the data transmitting/receiving units or transmitting the cartridge information thereto through a corresponding command data receiving path.

Preferably, the method may further comprises a step of transmitting information read from the cassette memory of the mounted cassette together with the cartridge information thereto.

According to the present invention, since the tablet automatic packaging machine according to the present invention records cartridge information in a memory of a cartridge and transmits the information to an external device, a server as the external device can easily confirm location of the cartridge, and can also identify cartridges not coupled to the tablet cassettes.

In addition, since the tablet automatic packaging machine according to the present invention can dually divide a path performing data reception/transmission from/to a server as an external device into a transmission path of commands related to preparation and a transmission path of commands related to cassette positions, the server can confirm the cassettes positions as occasion demands.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

With reference to the attached drawings, the preferred embodiment of the present invention is described in detail below. In the following description, a detailed description of known functions and configurations incorporated herein will be omitted when it may make the subject matter of the present invention rather unclear.

Figure 1:
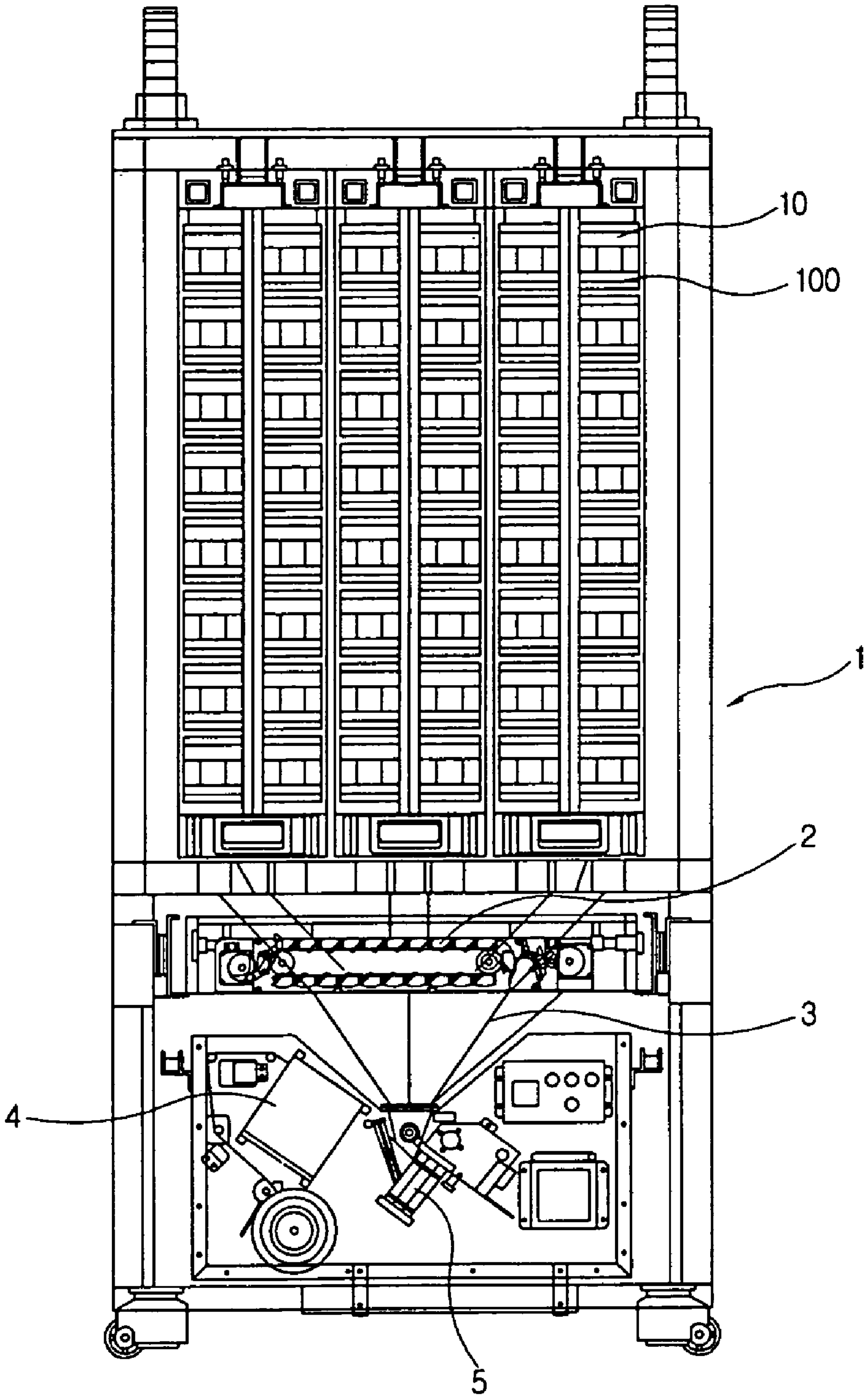
FIG. 1 is a front cross-sectional view illustrating a table automatic packaging machine according to the present invention.
Figure 2:
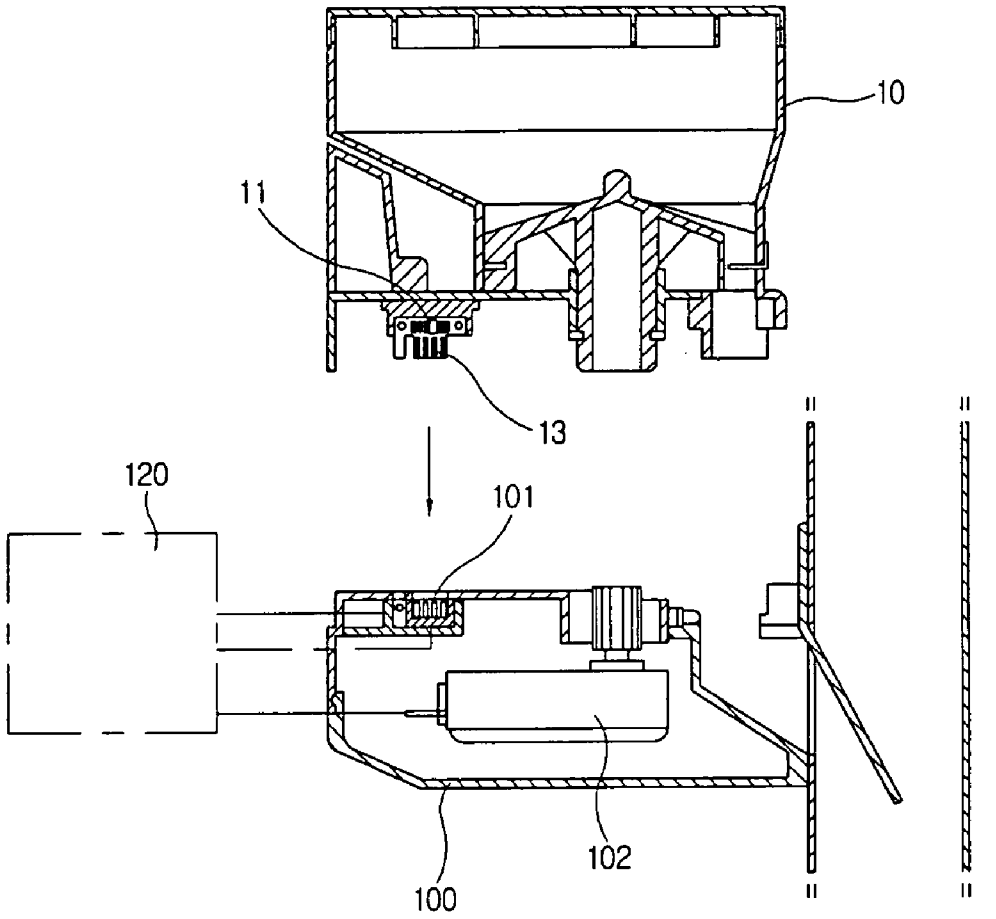
FIG. 2 is an exploded cross-sectional view illustrating a table automatic packaging machine according to the present invention, in which a tablet cassette and a cartridge as a cassette supporter are dissembled.

FIG. 1 is a front cross-sectional view illustrating a table automatic packaging machine according to the present invention, and FIG. 2 is an exploded cross-sectional view illustrating a table automatic packaging machine according to the present invention, in which a tablet cassette and a cartridge as a cassette supporter are dissembled.

As shown in FIG. 1, the tablet automatic packaging machine 1 includes a plurality of tablet cassettes 10 on a shelf located a predetermined height from the bottom, and a plurality of cartridges 100 functioning as cassette supporters corresponding to the plurality of tablet cassettes 10. Also, the tablet automatic packing machine 1 includes a conveying tray 2 thereunder, and a hopper 3, a printing unit 4 and a heater which are installed under the conveying tray 2.

During operation of the tablet automatic packing machine as configured above, when tablets are discharged from the tablet cassette 10 to the conveying tray 2 according to a prescription transmitted from a server as an external device, the conveying tray 2 drops the tablets to the hopper 3 based on dosage units. The tablets dropped in the hopper 3 are contained in pouches printed by the printing unit 4, and are successively packaged and sealed by heat from the heater 5 based on dosage units.

More specifically, with reference to FIG. 2, operations of the tablet automatic packing machine are described in detail below.

Firstly, a cassette automatic recognition device identifies tablets contained in the tablet cassettes. The cassette automatic recognition device includes a tablet cassette 10 and a cartridge 100. When the tablet cassette 10 is installed in the cartridge 100, a micro-computer unit (MCU) 120 within the cartridge 100 reads information recorded in the memory 11 installed in the tablet cassette 10. Here, the read information is tablet information or cassette information, for example. For this, a connection lead 13 is formed within the tablet cassette 10 such that the MCU 120 within the cartridge 100 normally accesses information recorded in the memory 11. The cartridge 100 includes a socket 101 mechanically and electrically connected to the connection lead 13. Therefore, the memory 11 of the tablet cassette 10 can be electrically connected to the MCU 120 of the cartridge which will be described later.

Figure 3:
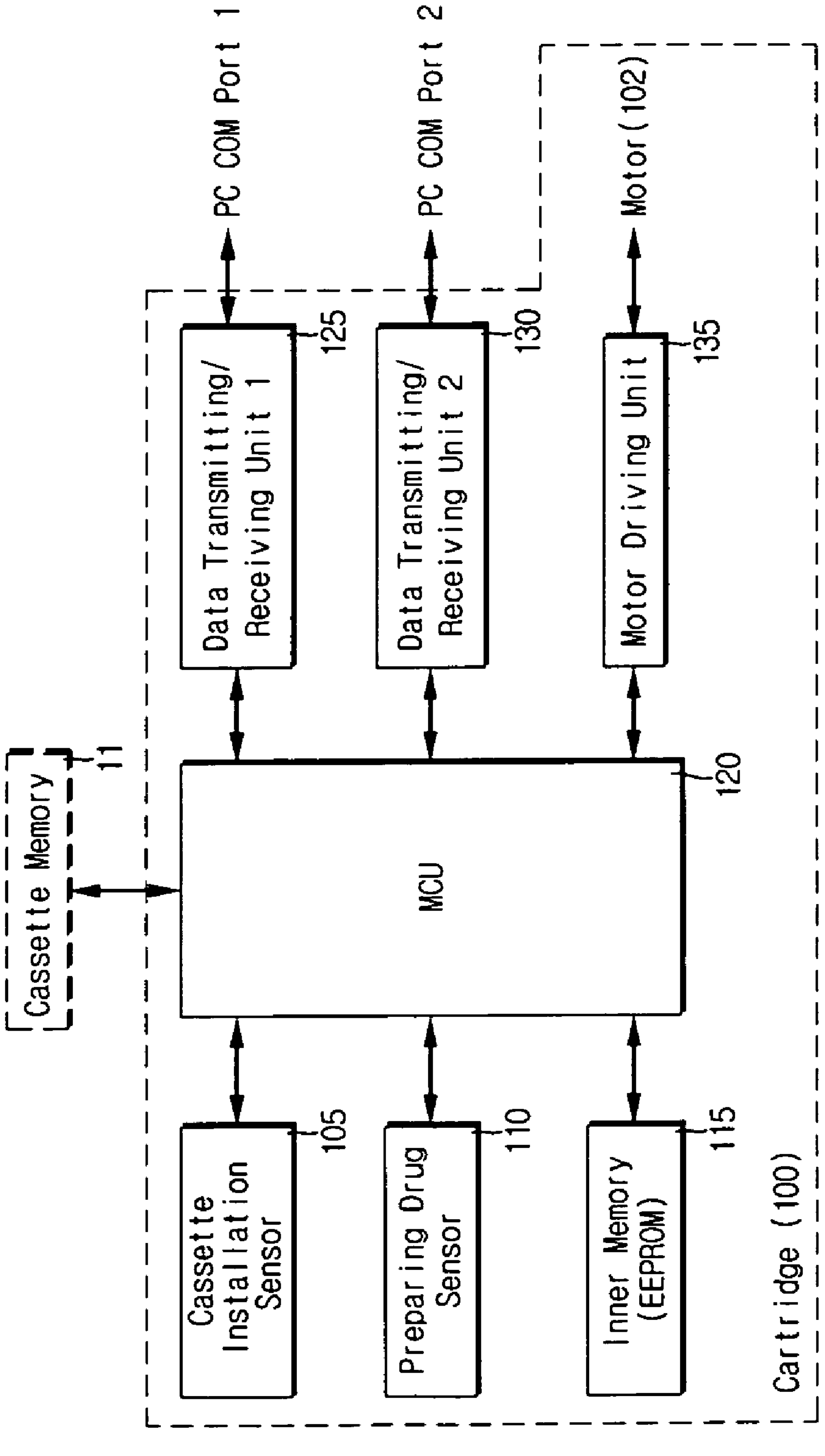
FIG. 3 is a block diagram illustrating a cartridge of the tablet automatic packaging machine according to the present invention.

With reference to FIG. 3, electric parts included in the cartridge 100 are described in detail below.

Figure 4:
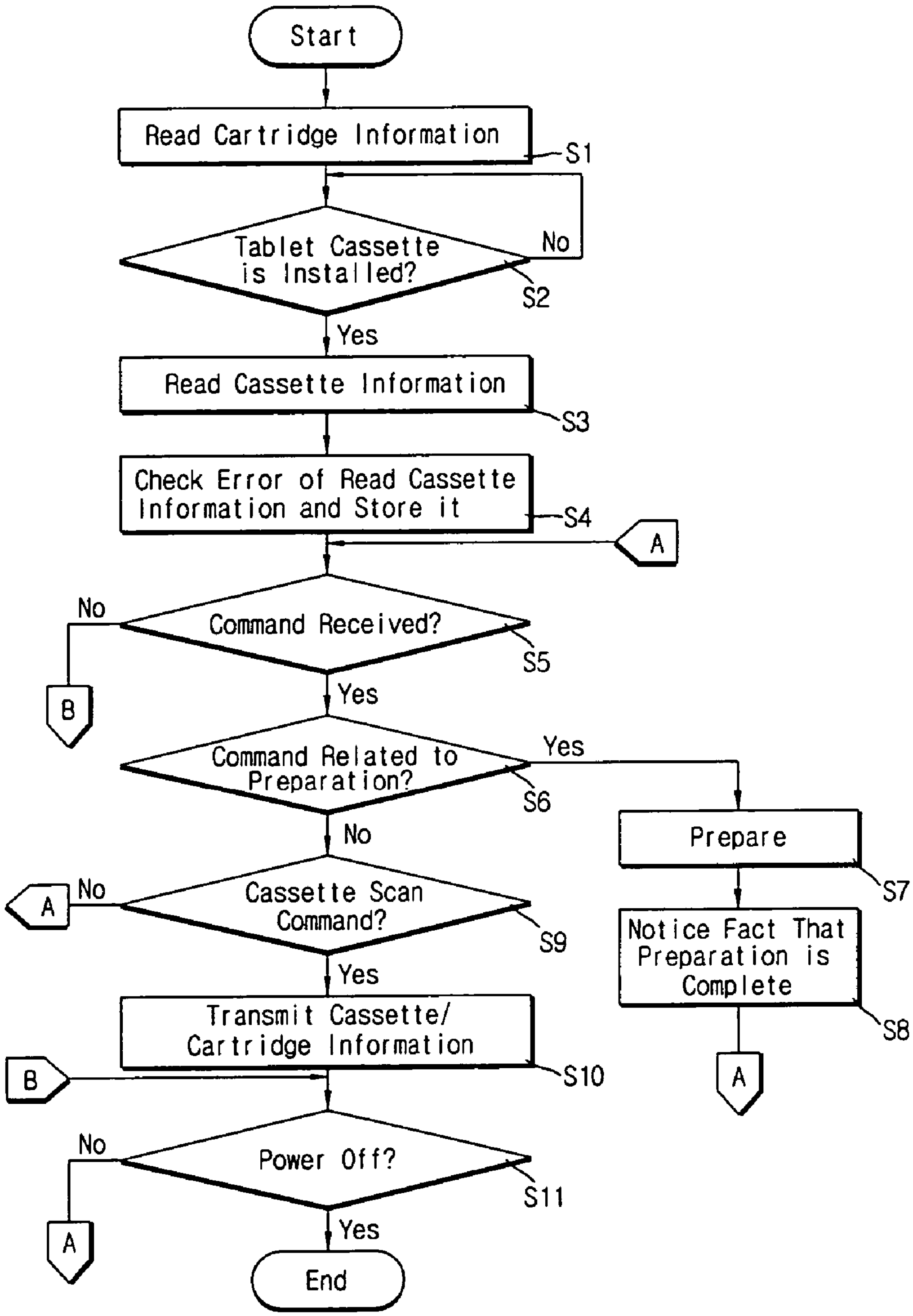
FIG. 4 is a flowchart describing a method for automatically recognizing cassettes through a micro-computer unit (MCU) 120 of FIG. 3.

FIG. 3 is a block diagram illustrating a cartridge of the tablet automatic packaging machine according to the present invention, and FIG. 4 is a flowchart describing a method for automatically recognizing cassettes through an MCU 120 of FIG. 3.

As shown in FIG. 3, the cartridge 100 of the tablet automatic packing machine includes a cassette installation sensor 105 and a preparing drug sensor 110. Each of the sensors 105 and 110 may be implemented with a photo sensor. The sensors 105 and 110 are located at proper positions to sense the installation state of the cassette and passage of the tablets contained in the tablet cassette 10, respectively. The sensors 105 and 110 are controlled in a pulse width modulation (PWM) fashion by the MCU 120, which will be described later.

On the other hand, the cartridge 100 further includes an electrical erasable programmable read only memory (EEPROM) as an inner memory, in which cartridge information is stored. The cartridge information is read by the MCU 120 and is transmitted to an external device (or a server) which can be connected to the tablet automatic packing machine. Here, the MCU 120 reads cartridge information recorded in the memory 115 and information recorded in the connectable tablet cassette memory 11 through an $I^2C$ bus.

In addition, the cartridge 100 of the tablet automatic packing machine further includes two data transmitting/receiving units 125 and 130 for performing data communication with an external device (server). The data transmitting/receiving unit 1 denoted by reference numeral 125 serves to transmit/receive command data related to preparation and the result of the command data thereto/therefrom, and the data transmitting/receiving unit 2 denoted by reference numeral 130 serves to transmit/receive command data related to cassette positions and cartridge information of the command data. Here, the data transmitting/receiving units 125 and 130 are implemented with RS232 to RS485 converters. Namely, since each cartridge of the tablet automatic packing machine according to the present invention has dual transmission paths for commands related to preparation and commands related to cassette positions, the external device (server) can confirm the cassette position as occasion demands.

The MCU 120 controls overall operations of the cartridge 100. For example, when command data related to cassette positions is received from the data transmitting/receiving unit 130, the MCU 120 reads cartridge information recorded in the inner memory 115, in response to the reception of the command data, and transmits the information to the external device through the data transmitting/receiving unit 130. As the external device is requested, the MCU 120 may transmit the information read from the cassette memory 11 together with the cartridge information to external device through the data transmitting/receiving unit 130.

On the other hand, reference numeral 135 denotes a motor driving unit which generates a signal for driving a motor 102 according to control of the MCU 120.

With reference to FIG. 4, operations of the tablet automatic packing machine, in which a plurality of cartridges are arranged in multiple layers, are described in detail below.

When power is inputted to the tablet automatic packing machine, the MCU 120 within each cartridge 100 reads cartridge information recorded in the inner memory 115 and records the read information in an RAM in step S1. After that a check is performed through the sensor 105 to determine whether the tablet cassette 10 is installed in step S2. If the table cassette 10 is installed thereto, cassette information (or tablet information) is read from the cassette memory 11 in step S3. After that, error check for the read cassette information (or tablet information) is performed. If the read cassette information does is free of error, it is stored in the RAM in step S4. Here, the error check method for the read cassette information is implemented to check whether it has normal ASCII code.

As such, when the cartridge information and the cassette information have been normally read in a state where the tablet cassette 10 is normally installed, the MCU 120 checks whether commands are received through the data transmitting/receiving units 125 and 130 in step S5. If commands are received, the MCU 120 checks whether the received commands are commands related to preparation, which are received through the data transmitting/receiving unit 125, in step S6. If such a determination is affirmative, the MCU 120 controls the motor 102 such that preparation is performed according to the commands related to preparation in step S7. After that, a notice for preparation completion is transmitted to the external device through the data transmitting/receiving unit 125 in step S8 and then returns step S5.

On the other hand, if the received commands are not commands related to preparation, but commands related to cassette positions, for example, a cassette scan command, in step S9, the MCU 120 transmits cartridge information read in the previous step (which may include cassette information) to the external device through the data transmitting/receiving unit 130 in step S10.

After that, the external device displays the cartridge information of each cartridge transmitted from the MCU 120 on a display, such that an administrator can view locations of the cartridge through the display, and can visually confirm currently used cartridges according to transmitted cassette information. Also, the administrator can easily confirm information of tablets contained in a tablet cassette which is installed to the cartridge 100.

In addition, the cartridge 100 according to the present invention can receive the commands related to preparation and commands related to cassette locations through different paths. The external device can confirm the cassette locations as occasion demands.

As mentioned above, the tablet automatic packing machine has advantages in that, since cartridge information is recorded in a memory of a cartridge and the cartridge information is transmitted to an external device, a server as the external device can easily confirm location of the cartridge, and can also identify cartridges not coupled to the tablet cassettes.

In addition, the tablet automatic packing machine has advantages in that, since a path performing data reception/transmission from/to a server as an external device is duly divided into a transmission path of commands related to preparation and a transmission path of commands related to cassette positions, the server can confirm the cassettes positions as occasion demands and can easily confirm information of tablets contained in the cassettes which are coupled to each other based on cartridges.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tablet automatic packing machine comprising a plurality of cartridges arranged in multiple layers, each cartridge being coupled to a tablet cassette having a cassette memory, in which tablet information or cassette information is recorded, and a connection lead, each cartridge comprising:

a socket connected to the connection lead;

a cassette installation sensor configured to sense an installation state of the cassette;

a preparing drug sensor configured to sense a passage of a tablet;

an inner memory configured to store cartridge information;

a first data transmitting/receiving unit to transmit and receive commands related to preparation therefrom/thereto;

a second data transmitting/receiving unit to transmit and receive commands related to cassette positions; and a control unit to control transmission from the cartridge information read from the inner memory to an external device based on reception of the command related to cassette positions, wherein the control unit controls that information read from the cassette memory through the socket in the cartridge is transmitted to the second data transmitting/receiving unit together with the cartridge information.

* * * * *